Figure 1:
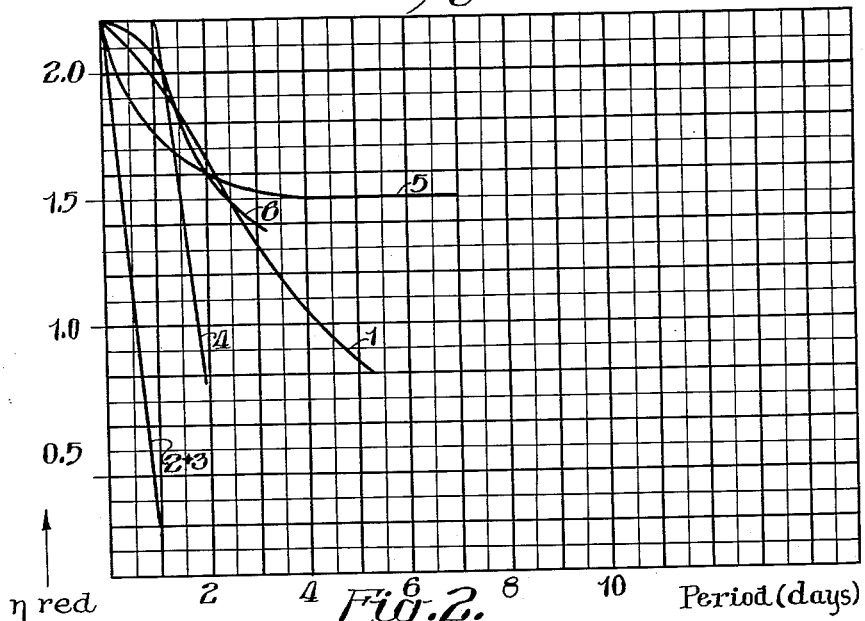
Figure 2:
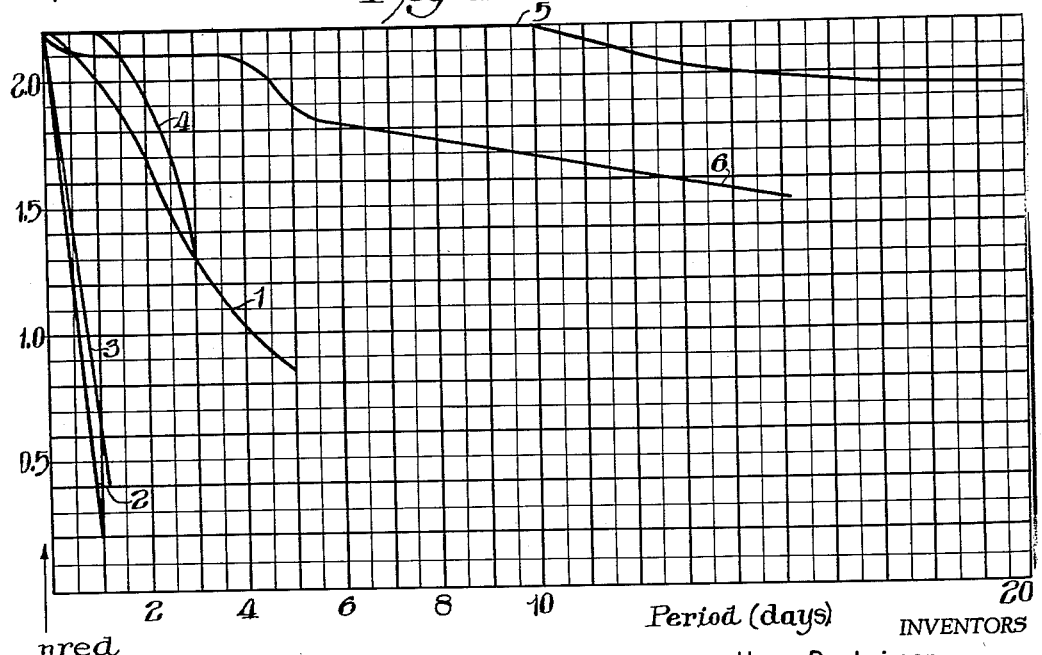

United States Patent Office 3,058,952
Patented Oct. 16, 1962

3,058,952
STABILIZATION OF POLYOLEFINS
Hans Dexheimer, Mainz-Mombach, and Otto Fuchs and Werner Schmieder, Hofheim (Taunus), Germany, assignors, by mesne assignments, to Hercules Powder Company Incorporated, Wilmington, Del., a corporation of Delaware
Filed Jan. 12, 1960, Ser. No. 2,005
Claims priority, application Germany Jan. 17, 1959
7 Claims. (Cl. 260—45.8)

The present invention relates to the stabilization of polyolefins.

The utilization of polyolefins is rendered difficult in practice owing to their sensitiveness to oxidation. In most cases, oxidation involves a degradation of the macromolecules; in some cases there also takes place a cross-linking of the macromolecules. Both changes, i.e. the degradation and the cross-linking, manifest themselves, for example, by the fact that the surface of a polyolefin sheet tends to craze after a certain time and the whole sheet gets brittle so that it breaks in the case of a slight mechanical deformation. For the practical application of polyolefins it is, therefore, necessary to add to the polyolefins certain substances, referred to hereinafter shortly as "stabilizers," in order to avoid oxidation processes.

As causes for a change of the material in the presence of air, the following cases have to be distinguished:

(a) a purely thermal oxidation;
(b) an oxidation catalyzed by the presence of traces of heavy metals;
(c) an oxidation brought about by the influence of light.

Since the mechanism of each of these three processes differs from the other, it is necessary to employ a different type of stabilizer for each oxidation cause. For example, certain phenol derivatives are suitable for preventing the purely thermal oxidation. The harmful influence of metals can be diminished by compounds which inactivate the metals, for example by the formation of a complex. As light-stabilizers there are suited, for example, benzophenone derivatives. In order to sufficiently stabilize a polyolefin, one representative of each specific stabilizer has to be admixed to the polyolefin.

The simultaneous utilization of several substances for the purpose of stabilizing involves—in addition to the necessity of having at one's disposal several stabilizers and to add the correct amount thereof—still the following disadvantages:

In order to distribute the stabilizers homogeneously in the polyolefins which are generally available in a pulverulent form, it is necessary previously to dissolve the stabilizers and to mix the solution with the polyolefin; however, it is in many cases difficult to find a common solvent for all three types of stabilizers required so that it becomes necessary to incorporate the stabilizers one after the other in several stages. Moreover, there is a risk that the individual types of stabilizers, especially at the processing temperatures of the polyolefins, partly react with one another with the formation of novel ineffective compounds; therefore, only certain stabilizers which do not react with one another can be combined which implies that the choice of stabilizers becomes limited. Finally, the amounts of each stabilizer which have to be incorporated in the polyolefin in order to assure a sufficient stabilization must be adjusted to one another, which requires much additional preliminary work.

These disadvantages could be diminished or avoided altogether if one type of stabilizer could inhibit simultaneously two, or even better all three of the causes of oxidation mentioned. Compounds of this kind have not yet been described.

Now we have found that homopolymers and copolymers of olefins can be stabilized with 2,4,6-derivatives of 1,3,5-trithiane containing hydroxyl groups having a phenolic character. The observation was particularly unexpected that, when applying the stabilizer according to the invention, there is not only prevented the oxidation of the polyolefins by heat or light but there is simultaneously eliminated the harmful catalytic influence of heavy metals which, when admixed to the polyolefins, also bring about a decomposition. The trithiane compounds according to the invention are obtained by introducing hydrogen sulfide into an alcoholic hydrochloric acid-containing solution of an aldehyde at low temperatures as described in "Berichte der Deutschen Chemischen Gesellschaft," volume 24, page 1435 et seq. (1891), referred to in Beilstein "Handbuch der Organischen Chemie," Fourth Edition, volume XIX, pages 405 and 403; these compounds have the following constitution, in which R is a radical containing a hydroxyl group having a phenolic character:

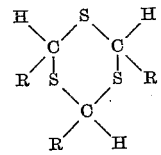

R may represent, for example:

(1) 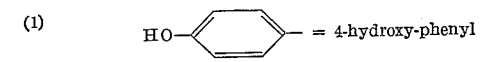 = 4-hydroxy-phenyl (2) 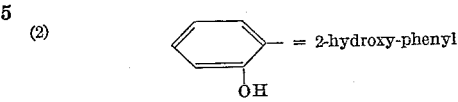 = 2-hydroxy-phenyl (3) 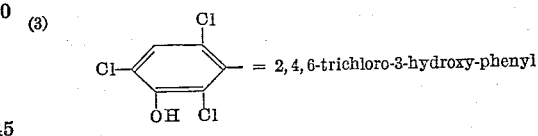 = 2,4,6-trichloro-3-hydroxy-phenyl (4) 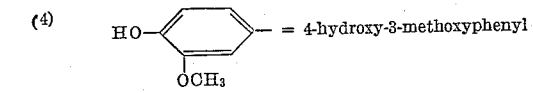 = 4-hydroxy-3-methoxyphenyl (5) 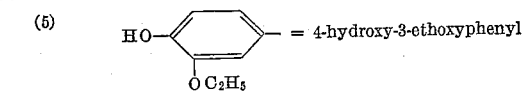 = 4-hydroxy-3-ethoxyphenyl (6) 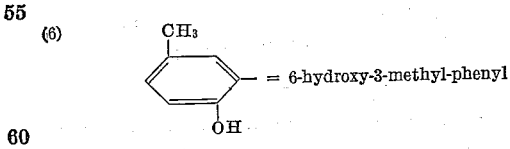 = 6-hydroxy-3-methyl-phenyl (7) 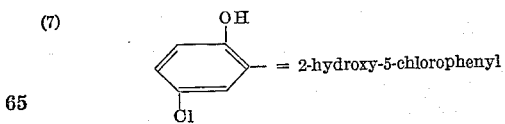 = 2-hydroxy-5-chlorophenyl All compounds cited have a good stabilizing action; when using low-pressure polyethylene, for example the action exhibited by the compounds diminishes in the following sequence: 4, 5, 6, 1, 7, 2 and 3.

It is particularly advantageous to add the trithianes used as stabilizers according to the invention to the polyolefins in an amount ranging from 0.01 to 2%.

Polyolefins that can be stabilized in this manner are, for example, the polymers of ethylene, propylene, n-butylene or isobutylene and higher alkenes containing up to 18 carbon atoms, the polymers of hydrocarbons having more than one double bond (for example of butadiene, isoprene), also any copolymers of these monomers and any mixtures of various polyolefins. The stabilizing action of the 1,3,5-trithiane compound does not depend on the mode of preparing the polyolefins (for example preparation by the high-pressure process or low-pressure process, polymerization in the melt, in a solvent or as a suspension, utilization of homogeneously dissolved or of insoluble catalysts, etc.).

The stabilizing action of the trithianes used according to the invention is especially advantageous in the case of low-pressure polymers or copolymers of olefins. Low-pressure polymers of this kind can, for example, be obtained by the Ziegler process or by the Phillips process.

The aforementioned low-pressure polymerization processes of olefins are described, for example, in the book "Polyethylene," by Raff-Allison, pp. 66 through 81.

It is possible, on principle, to remove the traces of heavy metals still adhering to the polyolefins from the reaction vessel, from the catalysts or from the processing by a corresponding purification of the polyolefins. Such a purification, however, involves considerable expense and it must also be considered that, in the course of processing the polyolefins, for example on a roll, an extruder or similar metallic devices, traces of metal again penetrate into the polyolefin. It must therefore be assumed that all polyolefins include traces of heavy metals.

The following examples show the stabilizing action of the 1,3,5-trithiane compounds. According to the examples, the stabilizers were—always in the dissolved state—mixed intimately with the pulverulent polyolefin. After the evaporation of the solvent, the stabilized pulverulent polyolefins were either heated and the degradation by oxidation determined by measuring the specific viscosity, or compression-molded sheets of a thickness of 1 mm. were made from the stabilized polyolefin at temperatures situated 30 to 40° C. above the melting point of the polyolefins. The behavior of the sheets was then tested either at an elevated temperature (for example, 120° C when using low-pressure polyethylene, or 130° C. when using polypropylene) or at a temperature of 20° to 30° C. under the influence of light resembling daylight. The degree of deterioration of the sheets caused by oxidation was determined by a flexural test; a sheet that had not oxidized could be bent by 180° without breaking while a deteriorated sheet, upon being bent by a few degrees only, showed a sharp rupture at the bending edge.

The stabilizers used according to the invention may, of course, also be applied together with other stabilizers usually employed for the stabilization of polyolefins. The low-pressure polyelofins cited in the following examples are obtained by the Ziegler process.

The following examples serve to illustrate the invention but they are not intended to limit it thereto:

Example 1

A compression-molded sheet of low-pressure polyethylene containing no stabilizer was, while heating it to 120° C., oxidized so rapidly that it got brittle after two to three days. However, when 0.2% of 2,4,6-tris-(4-hydroxyphenyl)-1,3,5-trithiane was added to the same low-pressure polyethylene, the sheet withstood the endurance test for 26 days while the same testing methods were applied. When applying 0.2% of 2,4,6-tris-(4-hydroxy-3-methoxyphenyl)-1,3,5-trithiane, the sheet even broke after 48 days only.

The following table gives a comparison between the stabilizing action of these compounds and that of some other known compounds.

TABLE

| | Brittle time at 120° C., days |
|---|---|
| Low-pressure polyethylene plus 0.2% by weight of 2,6-di-tertiary-butyl-para-cresol | 4 |
| Low-pressure polyethylene plus 0.2% by weight of di-phenyl-para-phenylene-diamine | 22 |
| Low-pressure polyethylene plus 0.3% by weight of a condensation product of acetone and nonylphenol | 12 |
| Low-pressure polyethylene plus 0.2% by weight of 2,4,6-tri-(4-hydroxy-phenyl)-1,3,5-trithiane | 26 |
| Low-pressure polyethylene plus 0.2% by weight of 2,4,6-tri-(4-hydroxy-3-methoxyphenyl)-1,3,5-trithiane | 48 |

Example 2

Low-pressure polypropylene is much more sensitive to oxidation than low-pressure polyethylene so that, when heating a sheet to 130° C., it got brittle already after several hours due to oxidation. In order to assure a sufficient stabiliaztion, a somewhat higher amount of stabilizer has to be applied than when using low-pressure polyethylene. For example, when adding 0.5% of 2,4,6-tris-(4-hydroxy-phenyl)-1,3,5-trithiane, the test specimen did not break for seven days, and when adding 0.5% of 2,4,6-tris-(4-hydroxy-3-methoxy-phenyl)-1,3,5-trithiane it did not break for 24 days even.

Example 3

The stabilization of polyolefins against thermal oxidation can be appreciably improved by the addition of known polyolefin stabilizers on the basis of phenol. When a compression-molded sheet of low-pressure polypropylene contained, for example, 0.5% of the condensation product of acetone and nonylphenol, the sheet became useless after 10 days while being stored at 130° C. However, when 0.5% of a mixture consisting of the same parts by weight of the same condensation product and of 2,4,6-tris-(4-hydroxy-phenyl)-1,3,5-trithiane was used, the test specimen only got brittle after 33 days. 0.5% of a mixture of 75 parts by weight of the aforecited nonylphenol condensate and 25 parts by weight of 2,4,6-tris-(4-hydroxy-3-methoxyphenyl)-1,3,5-trithiane was capable of stabilizing the low-pressure polypropylene for 30 days.

Example 4

In order to test the harmful influence of heavy metals, 0.009% of manganese in the form of Mn-stearate was added to the low-pressure polyethylene. This low-pressure polyethylene containing manganese was then stabilized with various substances. These mixtures were heated in a pulverulent form to 120° C. The degree of degradation was determined by viscosimetric measurements. The values obtained are shown in Diagrams 1 and 2. The abscissa represents the time of the heating in days, while the ordinate represents the $\eta$ spec/c. or reduced specific viscosity (measured in a solution of 0.1% strength in decahydronaphthalene at 135° C.).

In diagram 1, curves 1 to 6 represent:

Curve 1=low-pressure polyethylene without any addition;
Curve 2=low-pressure polyethylene+0.009% of manganese;
Curve 3=low-pressure polyethylene+0.009% of manganese+0.1% of N-stearoyl-para-aminophenol;
Curve 4=low-pressure polyethylene+0.009% Mn+0.1% of 4,4'-thio-bis-(6-tertiary-butyl-meta-cresol);
Curve 5=low-pressure polyethylene+0.009% Mn+0.1% of 2,4,6-tris-(4-hydroxy-phenyl)-1,3,5-trithiane;
Curve 6=low-pressure polyethylene+0.009% Mn+0.1% of 2,4,6-tris-(4-hydroxy-3-methoxy-phenyl)-1,3,5-trithiane.

In Diagram 2, curves 1 and 2 are identical with curves 1 and 2 of Diagram 1. The only difference between curves 3 to 6 of Diagram 2 and curves 3 to 6 of Diagram 1 is that the stabilizer was added in an amount of 0.3% instead of 0.1% (Diagram 1).

A comparison of curve 1 with curve 2 distinctly shows that the degradation is greatly accelerated in the presence of manganese. The known stabilizers N-stearoyl-para-amino-phenol and 4,4'-thio-bis-(6-tertiarybutyl-metacresol) only partly brought about a slight improvement, whereas the oxidation of the low-pressure polyethylene was strongly delayed in the presence of the 1,3,5-trithianes in spite of the presence of manganese. Iron, cobalt and copper behaved in a manner similar to manganese.

*Example 5*

When a compression-molded sheet of low-pressure polyethylene was exposed to light at a temperature of 20 to 30° C., it got brittle after an exposure to light of about 180 hours. When 0.1% of the known light-stabilizer 4,6-dibenzoyl-resorcine was added to the low-pressure polyethylene, the sheets, under otherwise similar test conditions, did not get brittle for 310 hours. The same effect was also realized with 0.1% of 2,4,6-tris-(4-hydroxy-3-methoxy-phenyl)-1,3,5-trithiane. When using 0.1% of 2,4,6-tris-(4-hydroxy-phenyl)-1,3,5-trithiane, the sheet even withstood the endurance test for 375 hours.

Further examples are enumerated in the following table which were conducted in a manner similar to that of the preceding examples.

As a testing method, there is used the exposure to light by means of a Xenotest lamp which method has been described in "Melliand Textilberichte" 39 (1958), page 246.

| Product | Stabilizer (percent by weight) | Brittle-time at 130° C., days | Xenotest exposure up to the brittle point, hours |
|---|---|---|---|
| Polypropylene | 0.2 of 2,4,6-tris-[2-hydroxy-phenyl]-1,3,5-trithiane | 1 | 50–100 |
| Do | 0.5 of 2,4,6-tris-[2-hydroxy-phenyl]-1,3,5-trithiane | 4 | |
| Do | 0.5 of a mixture of: 0.375 of 2,4,6-tris-[2-hydroxy-phenyl]-1,3,5-trithiane and 0.125 of a condensate of acetone and nonylphenol. | 8 | |
| Do | 0.5 of a mixture of: 0.25 of 2,4,6-tris-[2-hydroxy-phenyl]-1,3,5-trithiane plus 0.25 of a condensate of acetone and nonylphenol. | 37 | |
| Do | 0.2 of 2,4,6-tris-[5-chloro-2-hydroxy-phenyl]-1,3,5-trithiane | 17 | |
| Do | 0.5 of 2,4,6-tris-[5-chloro-2-hydroxy-phenyl]-1,3,5-trithiane | 3–6 | 200 |
| Do | 0.5 of a mixture of: 0.375 of 2,4,6-tris-[5-chloro-2-hydroxy-phenyl]-1,3,5-trithiane and 0.125 of a condensate of acetone and nonylphenol. | 3–6 | |
| Do | 0.5 of a mixture of: 0.25 of 2,4,6-tris-[5-chloro-2-hydroxy-phenyl]-1,3,5-trithiane and 0.25 of a condensate of acetone and nonylphenol. | 9 | |
| Do | 0.2 of 2,4,6-tris-[4-hydroxy-3-methoxy-phenyl]-1,3,5-trithiane | 6 | |
| Do | 0.5 of 2,4,6-tris-[4-hydroxy-3-methoxy-phenyl]-1,3,5-trithiane | 7 | 200 |
| Do.* | 0.5 of a mixture of: 0.375 of 2,4,6-tris-[4-hydroxy-3-methoxy-phenyl]-1,3,5-trithiane and 0.125 of a condensate of acetone and nonylphenol. | 24 | |
| Do.* | 0.5 of a mixture of: 0.25 of 2,4,6-tris-[4-hydroxy-3-methoxy-phenyl]-1,3,5-trithiane and 0.25 condensate of acetone and nonylphenol. | 30 | |
| Do | 0.2 of 2,4,6-tris-[6-hydroxy-3-methylphenyl]-1,3,5-trithiane | 20 | |
| Do | 0.5 of 2,4,6-tris-[6-hydroxy-3-methylphenyl]-1,3,5-trithiane | 3–6 | 200–250 |
| Do | 0.5 of a mixture of: 0.375 of 2,4,6-tris[6-hydroxy-3-methylphenyl]-1,3,5-trithiane and 0.125 of a condensate of acetone and nonylphenol. | 8 | |
| Do | 0.5 of a mixture of: 0.25 of 2,4,6-tris[6-hydroxy-3-methylphenyl]-1,3,5-trithiane and 0.25 of a condensate of acetone and nonylphenol. | 9 | |
| Do | 0.2 of 2,4,6-tris-[4-hydroxy-3-ethoxyphenyl]-1,3,5-trithiane | 8 | |
| Do | 0.5 of 2,4,6-tris-[4-hydroxy-3-ethoxyphenyl]-1,3,5-trithiane | 3 | 250–300 |
| Do | 0.5 of a mixture of: 0.375 of 2,4,6-tris-[4-hydroxy-3-ethoxyphenyl]-1,3,5-trithiane and 0.125 of a condensate of acetone and nonylphenol. | 19–22 | |
| Do | 0.5 of a mixture of: 0.25 of 2,4,6-tris-[4-hydroxy-3-ethoxyphenyl]-1,3,5-trithiane and 0.25 of a condensate of acetone and nonylphenol. | 15 | |
| Do | 0.2 of 2,4,6-tris-[2,4,6-trichloro-3-hydroxy-phenyl]-1,3,5-trithiane | 15 | |
| Do | 0.5 of 2,4,6-tris-[2,4,6-trichloro-3-hydroxy-phenyl]-1,3,5-trithiane | 2 | |
| Do | 0.5 of a mixture of: 0.375 of 2,4,6-tris-[2,4,6-trichloro-3-hydroxy-phenyl]-1,3,5-trithiane and 0.125 of a condensate of acetone and nonylphenol. | 2 | |
| Do | 0.2 of 2,4,6-tris-[4-hydroxy-phenyl]-1,3,5-trithiane | 7 | |
| Do | 0.5 of 2,4,6-tris-[4-hydroxy-phenyl]-1,3,5-trithiane | 2–4 | 200 |
| Do.* | 0.5 of a mixture of: 0.375 of 2,4,6-tris-[4-hydroxy-phenyl]-1,3,5-trithiane and 0.125 of a condensate of acetone and nonylphenol. | 7 | |
| Do | 0.5 of a mixture of: 0.25 of 2,4,6-tris-[4-hydroxy-phenyl]-1,3,5-trithiane and 0.25 of a condensate of acetone and nonylphenol. | 33 | |
| Do.* | 0.25 of thio-dipropionic acid-di-lauryl ester | 33 | |
| Do | 0.25 of 2,4,6-tris-[4-hydroxy-3-methoxyphenyl]-1,3,5-trithiane 0.25 of thio-dipropionic acid-di-lauryl ester | 15 | 200 |
| Do | 0.25 of 2,4,6-tris-[6-hydroxy-3-methylphenyl]-1,3,5-trithiane 0.25 of thio-dipropionic acid-di-lauryl ester | 15 | 200 |
| Do | 0.25 of 2,4,6-tris-[4-hydroxy-3-ethoxyphenyl]-1,3,5-trithiane 0.25 of thio-dipropionic acid-di-lauryl ester | 15 | 200 |
| Do | 0.25 of 2,4,6-tris-[4-hydroxy-3-ethoxyphenyl]-1,3,5-trithiane 0.25 of a condensate of acetone and nonylphenol | 5 | |
| Do | | 25 | |

| Product | Stabilizer (percent by weight) | Brittle-time at 120° C., days | Xenotest exposure up to the brittle point, hours |
|---|---|---|---|
| Polyethylene (Ziegler) | 0.1 of 4,6-dibenzoyl-resorcine | 2–3 | 150–200 |
| Do | 0.2 of 2,4,6-tris-[2-hydroxy-phenyl]-1,3,5-trithiane | 18 | 310 |
| Do | 0.5 of 2,4,6-tris-[2-hydroxy-phenyl]-1,3,5-trithiane | 53 | |
| Do | 0.2 of 2,4,6-tris-[5-chloro-2-hydroxy-phenyl]-1,3,5-trithiane | 22 | |
| Do | 0.5 of 2,4,6-tris-[5-chloro-2-hydroxy-phenyl]-1,3,5-trithiane | 48 | |
| Do | 0.1 of 2,4,6-tris-[5-chloro-2-hydroxy-phenyl]-1,3,5-trithiane | | 250 |
| Do | 0.2 of 2,4,6-tris-[4-hydroxy-3-methoxy-phenyl]-1,3,5-trithiane | 48 | |
| Do.* | 0.5 of 2,4,6-tris-[4-hydroxy-3-methoxy-phenyl]-1,3,5-trithiane | 130 | *310 |
| Do | 0.1 of 2,4,6-tris-[4-hydroxy-3-methoxy-phenyl]-1,3,5-trithiane | 26 | |
| Do | 0.2 of 2,4,6-tris-[6-hydroxy-3-methyl-phenyl]-1,3,5-trithiane | 46 | |
| Do | 0.5 of 2,4,6-tris-[6-hydroxy-3-methyl-phenyl]-1,3,5-trithiane | | 310 |
| Do | 0.1 of 2,4,6-tris-[6-hydroxy-3-methyl-phenyl]-1,3,5-trithiane | 32 | |
| Do | 0.2 of 2,4,6-tris-[4-hydroxy-3-ethoxy-phenyl]-1,3,5-trithiane | 155 | |
| Do | 0.5 of 2,4,6-tris-[4-hydroxy-3-ethoxy-phenyl]-1,3,5-trithiane | | 375 |
| Do | 0.1 of 2,4,6-tris-[4-hydroxy-3-ethoxy-phenyl]-1,3,5-trithiane | 1 | |
| Do | 0.2 of 2,4,6-tris-[2,4,6-trichloro-3-hydroxy-phenyl]-1,3,5-trithiane | 1 | |
| Do | 0.5 of 2,4,6-tris-[2,4,6-trichloro-3-hydroxy-phenyl]-1,3,5-trithiane | 26 | |
| Do.* | 0.2 of 2,4,6-tris-[4-hydroxy-phenyl]-1,3,5-trithiane | | |

See footnote at end of table.

| Product | Stabilizer (percent by weight) | Brittle-time at 130° C., days | Xenotest exposure up to the brittle point, hours |
|---|---|---|---|
| Polyethylene (Ziegler) | 0.5 of 2,4,6-tris-[4-hydroxy-phenyl]-1,3,5-trithiane | | |
| Do | 0.1 of 2,4,6-tris-4-hydroxy-phenyl-1,3,5-trithiane | 95 | *375 |
| Copolymer ethylene: propylene (90:10) | 0.03 of 4,4-thio-bis-[6-tertiary-butyl-meta-cresol] | 2-5 | 250 |
| Do | 0.2 of 2,4,6-tris-[4-hydroxy-3-methoxy-phenyl]-1,3,5-trithiane | 34 | 450 |
| Do | 1.0 of 2,4,6-tris-[4-hydroxy-3-methoxyphenyl]-1,3,5-trithiane | 150 | 1,350 |
| | | Brittle-time at 110° C., days | |
| Polyethylene (high-pressure) | | 4 | 300 |
| Do | 0.2 of 2,4,6-tris-[4-hydroxy-3-methoxy-phenol]-1,3,5-trithiane | 25 | 400 |

NOTE.—The compounds or test values marked with (*) have already been mentioned in the body of the present application.

We claim:

1. A composition of matter comprising a solid polymer of an olefin of 2–4 carbon atoms and from 0.01 to 2% by weight of the polymer of a 2,4,6-substituted derivative of a 1,3,5-trithiane of the following formula:

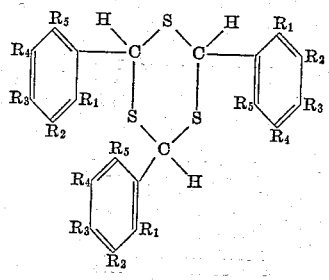

wherein the substituents $R_1$, $R_2$, $R_3$, $R_4$, and $R_5$ represent radicals selected from the group consisting of H, Cl, —$OCH_3$, —$OC_2H_5$, —$CH_3$, and OH, one of these substituents on each aromatic ring being always a hydroxyl group.

2. Composition of claim 1 wherein said olefin polymer is a homopolymer.
3. Composition of claim 1 wherein said olefin polymer is a copylymer of at least two olefins.
4. Composition of claim 1 wherein said olefin polymer is a low pressure polyethylene.
5. Composition of claim 1 wherein said olefin polymer is a low pressure polypropylene.
6. Composition of claim 1 wherein said olefin polymer is a low pressure copolymer of ethylene and propylene.
7. Composition of claim 1 wherein said olefin polymer is a low pressure poly(n-butylene).

References Cited in the file of this patent

UNITED STATES PATENTS 2,900,358 Stone et al. _____ Aug. 18, 1959
3,010,937 Roos et al. _____ Nov. 28, 1961